(12) United States Patent
Yusa

(10) Patent No.: US 11,746,933 B2
(45) Date of Patent: Sep. 5, 2023

(54) HYDROGEN-FILLING HOSE

(71) Applicant: THE YOKOHAMA RUBBER CO., LTD., Tokyo (JP)

(72) Inventor: Ikuma Yusa, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 24 days.

(21) Appl. No.: 17/633,726

(22) PCT Filed: Aug. 11, 2020

(86) PCT No.: PCT/JP2020/030538
§ 371 (c)(1),
(2) Date: Feb. 8, 2022

(87) PCT Pub. No.: WO2021/070465
PCT Pub. Date: Apr. 15, 2021

(65) Prior Publication Data
US 2022/0325828 A1    Oct. 13, 2022

(30) Foreign Application Priority Data
Oct. 11, 2019 (JP) .................................. 2019-187898

(51) Int. Cl.
*F16L 11/08* (2006.01)
*F16L 11/12* (2006.01)

(52) U.S. Cl.
CPC ............ *F16L 11/083* (2013.01); *F16L 11/12* (2013.01)

(58) Field of Classification Search
CPC .......... F16L 11/083; F16L 11/88; F16L 11/12
USPC .......................... 138/129, 130, 133, 134, 138
See application file for complete search history.

(56) References Cited

U.S. PATENT DOCUMENTS

| | | | |
|---|---|---|---|
| 4,402,346 A * | 9/1983 | Cheetham | F16L 11/083 138/132 |
| 6,334,466 B1 * | 1/2002 | Jani | F16L 11/088 138/172 |
| 8,356,637 B2 * | 1/2013 | Gregrich | F16L 11/086 138/125 |

(Continued)

FOREIGN PATENT DOCUMENTS

| | | |
|---|---|---|
| JP | S49/23923 B1 | 6/1974 |
| JP | S54-128022 A | 10/1979 |

(Continued)

*Primary Examiner* — Patrick F Brinson
(74) *Attorney, Agent, or Firm* — Carrier, Shende & Associates P.C.; Joseph P. Carrier; Fulchand P. Shende

(57) ABSTRACT

A hydrogen-filling hose includes reinforcing layers provided coaxially layered between an inner surface layer and an outer surface layer that are coaxially layered. The inner surface layer is formed of a thermoplastic resin and has a gas permeation coefficient of dry hydrogen gas of $1 \times 10^{-8}$ cc·cm/cm²·sec.·cmHg or less at 90° C. A flow path formed by the inner surface layer has a diameter of 10 mm or more and 25 mm or less. The reinforcing layers includes four layers or more and eight layers or less, and each of the reinforcing layers has a spiral structure that is formed by spirally winding a metal wire material. Pricking holes extending through the outer surface layer in a thickness direction are dispersedly provided therein.

11 Claims, 2 Drawing Sheets

(56) References Cited

U.S. PATENT DOCUMENTS

| | | | |
|---|---|---|---|
| 8,714,204 B2* | 5/2014 | Bryant | B32B 1/08 138/135 |
| 11,085,560 B2 | 8/2021 | Yusa | |
| 2007/0036926 A1 | 2/2007 | Fish, Jr. et al. | |
| 2020/0149663 A1* | 5/2020 | Yusa | F16L 11/087 |

FOREIGN PATENT DOCUMENTS

| | | |
|---|---|---|
| JP | 2007-205417 A | 8/2007 |
| JP | 2009-504445 A | 2/2009 |
| JP | 2018-194068 A | 12/2018 |

* cited by examiner

HYDROGEN-FILLING HOSE

TECHNICAL FIELD

The present invention relates to a hydrogen-filling hose and particularly relates to a hydrogen-filling hose capable of feeding high-pressure hydrogen gas at a larger flow rate.

BACKGROUND ART

Various hoses that feed hydrogen gas to fuel cell vehicles or the like have been proposed (for example, see Patent Document 1). A hydrogen-filling hose has been demanded not only to have superior hydrogen gas permeation resistance but also, in recent years, to supply a larger amount of hydrogen gas in a shorter time from a dispenser to fuel cell vehicles or the like.

When the inner diameter of the hose is simply increased to meet such a demand and the flow rate of high-pressure hydrogen gas is increased, burst pressure of the hose decreases. Consequently, pressure resistance performance of the hose needs to be improved. Forming a reinforcing layer of the hose from a metal wire material is more advantageous than forming that from fibers in reliably transferring force to adjacent layers and improving pressure resistance efficiency. Additionally, the reinforcing layer in a spiral structure is more advantageous than that in a braid structure in improving pressure resistance performance.

On the other hand, the amount of permeation of hydrogen gas increases as the inner diameter of the hose is increased. Accordingly, when the reinforcing layer is formed of a metal wire material, the metal wire material may easily embrittle by hydrogen. As a result, there is room for improving in the hose structure in order to feed high-pressure hydrogen gas at a larger flow rate.

CITATION LIST

Patent Literature

Patent Document 1: JP 2018-194068 A

SUMMARY OF INVENTION

Technical Problem

An object of the present invention is to provide a hydrogen-filling hose capable of feeding high-pressure hydrogen gas at a larger flow rate.

Solution to Problem

In order to achieve the object described above, a hydrogen-filling hose according to an embodiment of the present invention includes: an inner surface layer and an outer surface layer that are coaxially layered; and reinforcing layers coaxially layered between the inner surface layer and the outer surface layer. The hydrogen-filling hose is configured such that working internal pressure is 70 MPa or more and that the inner surface layer is formed of a thermoplastic resin having a gas permeation coefficient of dry hydrogen gas, which is $1 \times 10^{-8}$ cc·cm/cm$^2$·sec.·cmHg or less at 90° C. A flow path formed by the inner surface layer has a diameter of 10 mm or more and 25 mm or less. The reinforcing layers including four layers or more and eight layers or less, and each of the reinforcing layers has a spiral structure that is formed by spirally winding a metal wire material. Pricking holes extending through the outer surface layer in a thickness direction are dispersedly disposed.

Advantageous Effects of Invention

According to the present invention, by setting the diameter of the flow path to a large diameter of 10 mm or more and 25 mm or less, the flow rate of the high-pressure hydrogen gas can be increased. Further, the reinforcing layers include four layers or more and eight layers or less, and each of the reinforcing layers is formed in a spiral structure that is formed by spirally winding a metal wire material. Thus, the hose can ensure sufficient pressure resistance performance that can withstand practical use, with the flow path having a large diameter. Furthermore, the pricking holes are dispersedly disposed in the outer surface layer, and thus the hydrogen gas that has passed through the inner surface layer smoothly and easily flows out of the hose, which is advantageous in suppressing hydrogen embrittlement of the metal wire material.

DESCRIPTION OF EMBODIMENTS

Figure 1:
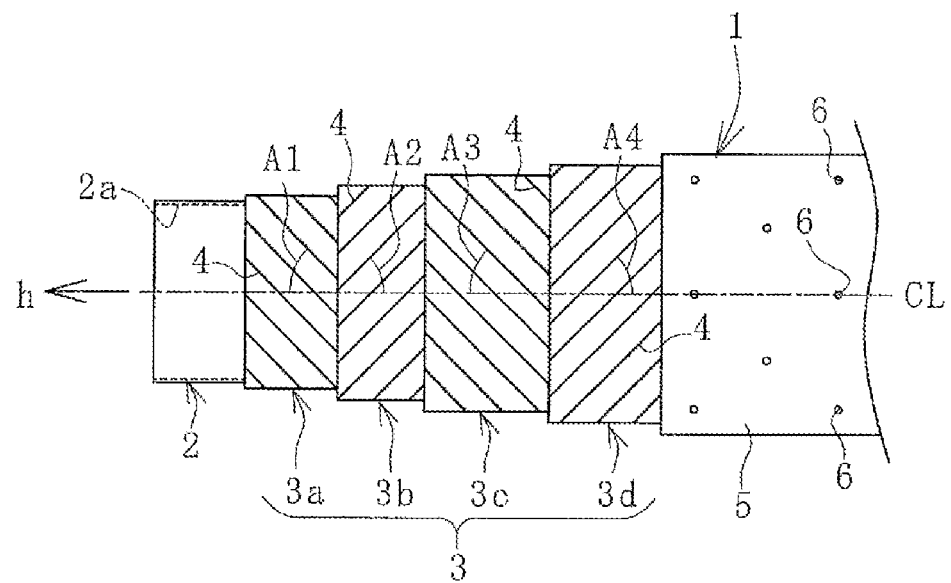
FIG. 1 is a partially cut-away side view illustrating a hydrogen-filling hose according to an embodiment of the present invention.

A hydrogen-filling hose according to the present invention will be described below based on embodiments illustrated in the drawings.

Figure 2:
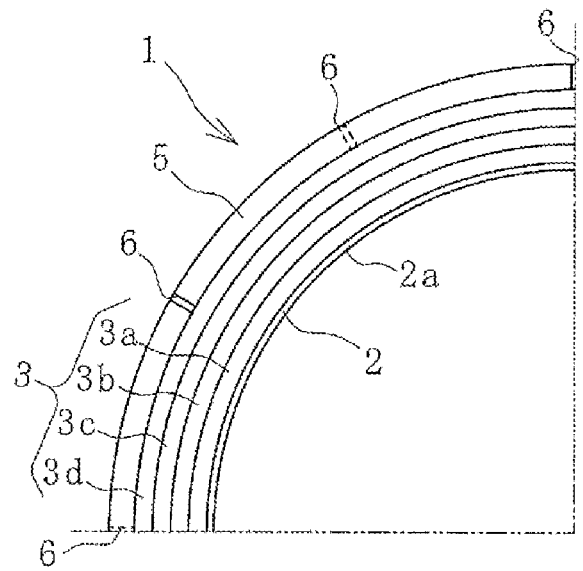
FIG. 2 is an explanatory diagram illustrating the hose of FIG. 1 in transverse cross-sectional view in a partially enlarged manner.

As illustrated in FIGS. 1 and 2, a hydrogen-filling hose 1 (hereafter referred to as a hose 1) according to an embodiment of the present invention is configured such that an inner surface layer 2, reinforcing layers 3 (3a, 3b, 3c, 3d), and an outer surface layer 5 are coaxially layered in the order from the inner circumferential side thereof. Note that a dot-dash line CL in the drawings represents a hose axis.

Figure 3:
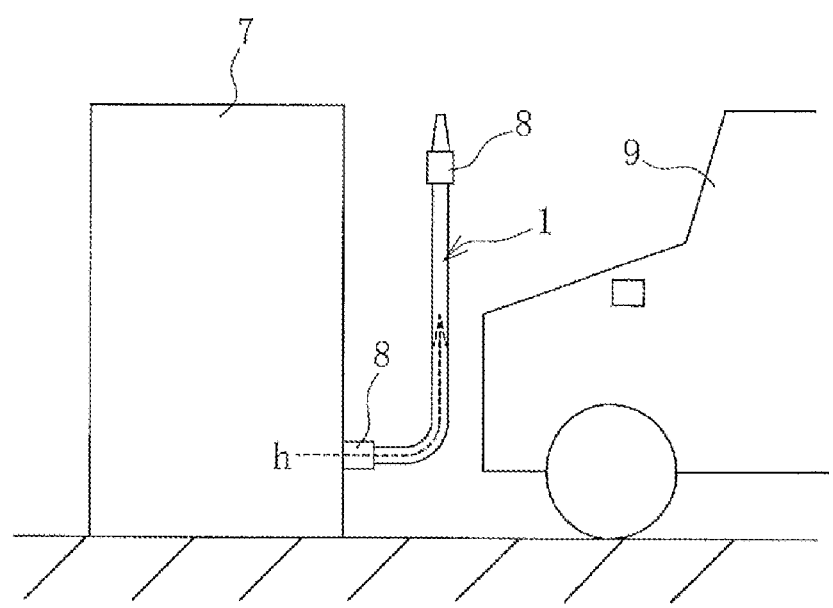
FIG. 3 is an explanatory diagram illustrating the hose equipped on a dispenser installed at a hydrogen station.

As illustrated in FIG. 3, when the hose 1 is equipped on a dispenser 7 installed at a hydrogen station, hose fittings 8 are crimped and attached to both ends of the hose 1. Hydrogen gas h at a low temperature (for example, −40° C. or more and −20° C. or less) and high pressure (for example, 70 MPa or more and 87.5 MPa or less) is supplied and fed from the dispenser 7 through the hose 1 to a vehicle 9, a storage tank, or the like. In other words, working internal pressure of the hose 1 is 70 MPa or more.

A flow path 2a having a cylindrical shape is formed by the inner surface layer 2 disposed on the innermost circumference of the hose 1. Since the high-pressure hydrogen gas h is directly brought into contact with the inner surface layer 2, the inner surface layer 2 is formed of a thermoplastic resin having a gas permeation coefficient of dry hydrogen gas, which is $1 \times 10^{-8}$ cc·cm/cm$^2$·sec.·cmHg or less at 90° C. The gas permeation coefficient is a value measured in accordance with JIS K7126. Examples of the thermoplastic resin include nylon (nylon 6, nylon 66, nylon 11, etc.), fluororesin, polyacetal, ethylene vinyl alcohol copolymers, etc.

By using a resin having excellent hydrogen gas barrier properties for the inner surface layer 2 as just described, superior hydrogen gas permeation resistance can be obtained. The diameter of the flow path 2*a* (that is, the inner diameter of the hose 1) is set to a large diameter of, for example, 10 mm or more and 25 mm or less, more preferably 12 mm or more and 25 mm or less, and more preferably 16 mm or more and 25 mm or less. As the diameter of the flow path 2*a* is increased, it is advantageous to increase the flow rate of the hydrogen gas h. As the diameter is decreased, it is advantageous to ensure (increase) pressure resistance performance (burst pressure) of the hose 1.

In order to suppress dimensional changes of the inner surface layer 2, the layer thickness is preferably increased. On the other hand, in order to ensure flexibility of the hose 1, the layer thickness of the inner surface layer 2 is preferably reduced. Accordingly, the layer thickness of the inner surface layer 2 is set to, for example, 0.5 mm or more and 2.5 mm or less, and more preferably to 1.0 mm or more and 2.0 mm or less.

The reinforcing layer 3 is formed of a metal wire material 4, and appropriate materials, structures, and the like are selected based on pressure resistance performance, bending performance, and the like required for the hose 1. In this embodiment, the reinforcing layers 3 include four layers, but are set in a range of four layers or more and eight layers or less based on the performance required for the hose 1.

Each of the reinforcing layers 3 has a spiral structure formed of the metal wire material 4. The metal wire materials 4 that respectively form the reinforcing layers 3*a*, 3*b*, 3*c*, 3*d* are spirally wound at predetermined braid angles A1, A2, A3, A4 with respect to the hose axis CL. The reinforcing layers 3*a*, 3*b*, 3*c*, 3*d* differ alternately in the winding direction of the metal wire material 4 in the layered order.

Since the reinforcing layers 3 layered adjacent to each other with the metal wire materials 4 wound in the different directions pair up with each other, the number of layers of the reinforcing layer 3 is basically a plurality of layers. An intermediate layer that prevents the reinforcing layers 3 from contacting each other can be disposed in-between. The intermediate layer can be formed of fibers, resin, rubber, or the like. The intermediate layer to be interposed between the layers is adhered to the reinforcing layers 3 layered adjacent to the intermediate layer.

Each of the braid angles A1, A2, A3, A4 is preferably 45° or more and 60° or less. When the braid angle is less than 45°, the amount of change in the radial direction of the hose 1 to which internal pressure is applied is excessively large. When the braid angle exceeds 60°, the amount of deformation in the longitudinal direction of the hose 1 is excessively large. The braid angles A1, A2, A3, A4 may be identical to or different from one another.

Examples of the metal wire material 4 include piano wire (specifications specified in JIS G 3502), hard steel wire materials (specifications specified in JIS G 3506), hard steel wire (specifications specified in JIS G 3521), stainless steel wire materials (specifications specified in JIS G 4308), wires of copper and copper alloy (specifications specified in JIS H 3260), wires of aluminum and aluminum alloy (specifications specified in JIS H 4040), wire of magnesium alloy (specifications specified in JIS H 4203), wires of titanium and titanium alloy (specifications specified in JIS H 4670), and these wires to which wire drawing is applied. The outer diameter of the metal wire material 4 is, for example, set to 0.2 mm or more and 1.2 mm or less, and more preferably to 0.25 mm or more and 0.40 mm or less, in consideration of the pressure resistance performance and flexibility of the hose 1. The physical properties of the metal wire material 4 include strength at break at ambient temperature of 100N or more, preferably 160N or more, and more preferably 200N or more, and elongation at break of 5% or less, more preferably 3.5% or less, and even more preferably 3.0% or less.

Appropriate materials are selected for the outer surface layer 5 disposed on the outermost circumference of the hose 1 based on the performances (weather resistance, wear resistance, flexibility, etc.) required for the hose 1, use environments, etc., and the appropriate layer thickness is set. The outer surface layer 5 can have a single layer structure made of a thermoplastic resin, or a multilayer structure of rubber and a thermoplastic resin. Examples of the thermoplastic resin that forms the outer surface layer 5 include polyurethane, polyester, and the like. Examples of the rubber include chloroprene acrylo-rubber, butyl rubber, ethylene propylene rubber, chlorosulfonated polyethylene rubber, and the like.

The layer thickness of the outer surface layer 5 is set to, for example, 0.2 mm or more and 1.5 mm or less, and more preferably to 0.5 mm or more and 1.0 mm or less. As the layer thickness of the outer surface layer 4 is increased, it is advantageous to ensure weather resistance of the hose 1. As the layer thickness is decreased, it is advantageous to ensure flexibility. In order to provide weather resistance and flexibility of the hose 1 in a compatible manner, the layer thickness of the outer surface layer 5 is preferably set to the range described above.

Pricking holes 6 extending through the outer surface layer 5 in the thickness direction are dispersedly disposed therein. The outer diameter of the pricking hole 6 is, for example, 0.2 mm or more and 1.2 mm or less. The disposal density of the pricking holes 6 is five pricking holes or more per the length of 1 m of the hose 1. The upper limit of the disposal density of the pricking holes 6 cannot be unconditionally specified. However, the disposable density effective in suppressing hydrogen embrittlement of the metal wire material 4 is identified, for example, based on experimental data or the like, while the function of the outer surface layer 5 is maintained, and thus the pricking holes 6 may be disposed at the identified disposal density. The pricking holes 6 are preferably disposed evenly distributed in the outer surface layer 5.

Since the inner diameter (diameter of a flow path) of a conventional hydrogen-filling hose is generally less than 10 mm, the hose 1 including the flow path 2*a* having a diameter of 10 mm or more and 25 mm or less has a large diameter compared with a known hose. Consequently, the flow rate of the high-pressure hydrogen gas h can be increased. In order to increase the flow rate, it is preferable that the diameter of the flow path 2*a* is 12 mm or more or 16 mm or more. Note that by applying the diameter of the hose to the specification more downsized, the diameter of the flow path 2*a* can be set to 4 mm or more and 25 mm or more.

In order to avoid a decrease in burst pressure of the hose 1 due to the large diameter of the flow path 2*a*, the reinforcing layers 3 formed of the metal wire material 4 in a spiral structure have specifications including four layers or more. Note that as the number of layers of the reinforcing layer 8 is increased, the flexibility of the hose 1 is impaired, and thus, in order to avoid this, the number of layers of the reinforcing layer 3 is eight or less. By setting this specification, the hose 1 ensures sufficient pressure resistance performance that can withstand practical use, with the flow path 2*a* having a large diameter.

Furthermore, as the flow rate of the hydrogen gas h flowing through the flow path 2*a* increases, the amount of the hydrogen gas h passing through the inner surface layer 2 also increases. Accordingly, the metal wire material 4 forming each of the reinforcing layers 3 is easily brought into contact with the hydrogen gas h. As the time during which the hydrogen gas h is in contact with the metal wire material 4 increases, hydrogen embrittlement of the metal wire material 4 is promoted, and the service life of the reinforcing layer 3 is shortened.

The outer surface layer 5 formed of rubber or resin has more difficulty in allowing permeation of the hydrogen gas h than the reinforcing layers 3 each formed by winding the metal wire material 4. Consequently, the time during which the hydrogen gas h that has passed through the inner surface layer 2 is in contact with the metal wire material 4 easily increases. Accordingly, the hose 1 includes the pricking holes 6 disposed dispersedly in the outer surface layer 5. The hydrogen gas h that has passed through the inner surface layer 2 easily and smoothly flows out of the hose 1 through the pricking holes 6. As a result, the time during which the metal wire material 4 forming each of the reinforcing layers 3 is in contact with the hydrogen gas h is shortened, which is advantageous in suppressing hydrogen embrittlement of the metal wire material 4.

It is also assumed that fluid other than the hydrogen gas h unintentionally flows in the flow path 2a. In this case, when the fluid remains inside the hose 1, internal pressure of the hose is reduced, and then the remaining fluid expands and interlayer peeling is highly likely to occur within the hose 1. Accordingly, a gas permeation rate T of each of the reinforcing layers 3 is increased more than that of the inner surface layer 2, and a gas permeation rate T of the outer surface layer 5 is increased more than that of each reinforcing layer 3. When an intermediate layer is interposed between the reinforcing layers 3, a gas permeation rate T of the intermediate layer is set to be equal to or greater than that of each reinforcing layer 3.

The gas permeation rate T (mm$^3$/mm$^2$·sec·MPa) is calculated by dividing a permeation coefficient P (mm$^3$·mm/mm$^2$·sec·MPa) by a layer thickness t of a layer allowing permeation of gas (T=P/t). Since the permeation coefficient P is the amount of gas passing through the layer per unit time, unit area, and unit pressure, the gas permeation rate T is an index that does not depend on the layer thickness t. The permeation coefficient P is specifically acquired in accordance with the gas permeability test method specified in JIS K 7126-1. The test temperature is room temperature, and air is used as the gas to be passed and thus the gas permeation rate is acquired.

In order to safely supply and feed the high-pressure hydrogen gas h from the dispenser 7 through the hose 1 to the vehicle 9 or the like, it is preferable that rates of change of the outer diameter and length of the hose 1 to which working internal pressure of 87.5 MPa is applied with respect to when working internal pressure is not applied to the hose 1 (when internal pressure of the hose is zero) are within ±1%. In order to allow the rates of change to be set within ±1%, an average of the braid angles A particularly in the reinforcing layers 3 is preferably 54° or more and 55° or less.

Additionally, in order to reliably supply and feed the high-pressure hydrogen gas h at a larger flow rate in a short time, the maximum flow rate of the hydrogen gas h may be set to from 60 g/min to 300 g/min when the working internal pressure of 87.5 MPa is applied to the hose 1 and the temperature of the hydrogen gas h flowing through the flow path 2a is −40° C. or more and −33° C. or less. In order to ensure the maximum flow rate, the flow path 2a is configured to have a large diameter as described above, and in the meantime, an optimal combination of the aforementioned specification of the reinforcing layer 3 that can ensure the pressure resistance performance of the hose 1 and the aforementioned specification of the pricking hole 6 is adopted.

Additionally, it is preferable that the amount of permeation of the hydrogen gas h from the flow path 2a to the outer side of the hose 1 is preferably 500 cm$^3$ (m·h) or less when the working internal pressure of 87.5 MPa is applied to the hose 1 and the environmental temperature in use of the hose 1 is 23±2° C. It is more preferable to ensure the aforementioned maximum flow rate of from 60 g/min to 300 g/min of the hydrogen gas h while ensuring the amount of permeation of 500 cm$^3$ (m·h) or less.

According to the hose 1, for example, the high-pressure hydrogen gas h can be supplied and fed to the vehicle 9 or the like at the same flow rate and for the same length of time as when about three known hoses having a small hose inner diameter are simultaneously used.

REFERENCE SIGNS LIST

1 Hydrogen-filling hose
2 Inner surface layer
2a Flow path
3 (3a, 3b, 3c, 3d) Reinforcing layer
4 Metal wire material
5 Outer surface layer
6 Pricking hole
7 Dispenser
8 Hose fitting
9 Vehicle
CL Hose axis

The invention claimed is:

1. A hydrogen-filling hose, comprising:
an inner surface layer and an outer surface layer that are coaxially layered; and
reinforcing layers coaxially layered between the inner surface layer and the outer surface layer, wherein
the hydrogen-filling hose being configured such that working internal pressure thereof is 70 MPa or more and that the inner surface layer is formed of a thermoplastic resin having a gas permeation coefficient of dry hydrogen gas, which is $1\times10^{-8}$ cc·cm/cm$^2$·sec.·cmHg or less at 90° C.,
a flow path being formed by the inner surface layer and having a diameter of 10 mm or more and 25 mm or less,
the reinforcing layers including four layers or more and eight layers or less, each of the reinforcing layers having a spiral structure that is formed by spirally winding a metal wire material,
pricking holes extending through the outer surface layer in a thickness direction and being dispersedly disposed,
each of the reinforcing layers has a gas permeation rate greater than that of the inner surface layer, and
the outer surface layer has a gas permeation rate greater than that of each of the reinforcing layers.

2. A hydrogen-filling hose, comprising:
an inner surface layer and an outer surface layer that are coaxially layered; and
reinforcing layers coaxially layered between the inner surface layer and the outer surface layer, wherein
the hydrogen-filling hose being configured such that working internal pressure thereof is 70 MPa or more and that the inner surface layer is formed of a thermoplastic resin having a gas permeation coefficient of dry hydrogen gas, which is $1\times10^{-8}$ cc·cm/cm$^2$·sec.·cmHg or less at 90° C., a flow path being formed by the inner surface layer and having a diameter of 10 mm or more and 25 mm or less, the reinforcing layers including four layers or more and eight layers or less, each of the reinforcing layers having a spiral structure that is formed by spirally winding a metal wire material, pricking holes extending through the outer surface layer in a thickness direction and being dispersedly disposed, and rates of change of an outer diameter and a length of the hose when a working internal pressure of 87.5 MPa is applied to the hose in comparison to when the working internal pressure of 87.5 MPa is not applied are within ±1%.

3. The hydrogen-filling hose according to claim 2, wherein a maximum flow rate of the hose is 60 g/min or more and 300 g/min or less when the working internal pressure of 87.5 MPa is applied and a temperature of hydrogen gas flowing through the flow path is −40° C. or more and −33° C. or less.

4. A hydrogen-filling hose, comprising:

an inner surface layer and an outer surface layer that are coaxially layered; and reinforcing layers coaxially layered between the inner surface layer and the outer surface layer, wherein the hydrogen-filling hose being configured such that working internal pressure thereof is 70 MPa or more and that the inner surface layer is formed of a thermoplastic resin having a gas permeation coefficient of dry hydrogen gas, which is $1 \times 10^{-8}$ cc·cm/cm²·sec·cmHg or less at 90° C., a flow path being formed by the inner surface layer and having a diameter of 10 mm or more and 25 mm or less, the reinforcing layers including four layers or more and eight layers or less, each of the reinforcing layers having a spiral structure that is formed by spirally winding a metal wire material, pricking holes extending through the outer surface layer in a thickness direction and being dispersedly disposed, and the amount of permeation of hydrogen gas from the flow path to an outer side of the hose is 500 cm³/(m·h) or less when the working internal pressure of 87.5 MPa is applied and an environmental temperature in use of the hose is 23±2° C.

5. The hydrogen-filling hose according to claim 2, wherein the amount of permeation of hydrogen gas from the flow path to an outer side of the hose is 500 cm³/(m·h) or less when the working internal pressure of 87.5 MPa is applied and an environmental temperature in use of the hose is 23±2° C.

6. The hydrogen-filling hose according to claim 3, wherein the amount of permeation of hydrogen gas from the flow path to an outer side of the hose is 500 cm³/(m·h) or less when the working internal pressure of 87.5 MPa is applied and an environmental temperature in use of the hose is 23±2° C.

7. The hydrogen-filling hose according to claim 2, wherein each of the reinforcing layers has a gas permeation rate greater than that of the inner surface layer, and the outer surface layer has a gas permeation rate greater than that of each of the reinforcing layers.

8. The hydrogen-filling hose according to claim 3, wherein each of the reinforcing layers has a gas permeation rate greater than that of the inner surface layer, and the outer surface layer has a gas permeation rate greater than that of each of the reinforcing layers.

9. The hydrogen-filling hose according to claim 4, wherein each of the reinforcing layers has a gas permeation rate greater than that of the inner surface layer, and the outer surface layer has a gas permeation rate greater than that of each of the reinforcing layers.

10. The hydrogen-filling hose according to claim 5, wherein each of the reinforcing layers has a gas permeation rate greater than that of the inner surface layer, and the outer surface layer has a gas permeation rate greater than that of each of the reinforcing layers.

11. The hydrogen-filling hose according to claim 6, wherein each of the reinforcing layers has a gas permeation rate greater than that of the inner surface layer, and the outer surface layer has a gas permeation rate greater than that of each of the reinforcing layers.

* * * * *